United States Patent
Sterns et al.

(10) Patent No.: US 9,384,160 B2
(45) Date of Patent: Jul. 5, 2016

(54) METHODS AND CONTROLLERS FOR AFFILIATION MANAGMENT

(75) Inventors: Randolph W. Sterns, Arvada, CO (US); Randy K. Hall, Boulder, CO (US); Chad Schneider, Fort Collins, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1217 days.

(21) Appl. No.: 12/204,119

(22) Filed: Sep. 4, 2008

(65) Prior Publication Data

US 2010/0057964 A1 Mar. 4, 2010

(51) Int. Cl.
*G06F 3/00* (2006.01)
*G06F 5/00* (2006.01)
*G06F 13/40* (2006.01)
*G06F 3/06* (2006.01)

(52) U.S. Cl.
CPC ............ *G06F 13/4022* (2013.01); *G06F 3/061* (2013.01); *G06F 3/0659* (2013.01); *G06F 3/0674* (2013.01); *G06F 2213/0032* (2013.01)

(58) Field of Classification Search
None
See application file for complete search history.

(56) References Cited

U.S. PATENT DOCUMENTS

| | | | | |
|---|---|---|---|---|
| 5,809,543 A * | 9/1998 | Byers et al. | | 711/162 |
| 6,839,892 B2 * | 1/2005 | Dawkins et al. | | 717/124 |
| 7,155,546 B2 * | 12/2006 | Seto | G06F 13/409 | 710/100 |
| 7,206,875 B2 * | 4/2007 | Marushak et al. | | 710/62 |
| 7,584,319 B1 * | 9/2009 | Liao et al. | | 710/317 |
| 7,594,060 B2 * | 9/2009 | Wilson et al. | | 710/316 |
| 7,739,432 B1 * | 6/2010 | Shaw et al. | | 710/74 |
| 7,835,380 B1 * | 11/2010 | Aloni | H04L 12/40032 | 370/394 |
| 8,127,059 B1 * | 2/2012 | Carr et al. | | 710/74 |
| 8,301,810 B2 * | 10/2012 | Pang | G06F 3/0607 | 710/72 |
| 8,862,794 B2 * | 10/2014 | Henning | G06F 3/0637 | 710/36 |
| 2003/0055864 A1 * | 3/2003 | Armstrong et al. | | 709/107 |
| 2003/0225724 A1 * | 12/2003 | Weber | | 707/1 |
| 2005/0005062 A1 * | 1/2005 | Liu et al. | | 711/112 |
| 2005/0071514 A1 * | 3/2005 | Anderson et al. | | 710/1 |
| 2005/0080881 A1 * | 4/2005 | Voorhees et al. | | 709/220 |
| 2005/0114555 A1 * | 5/2005 | Errickson et al. | | 710/3 |
| 2005/0138154 A1 * | 6/2005 | Seto | H04L 29/06 | 709/223 |
| 2005/0138221 A1 * | 6/2005 | Marushak | | 710/1 |
| 2005/0228924 A1 * | 10/2005 | Marushak | G06F 3/0607 | 710/300 |
| 2005/0246453 A1 * | 11/2005 | Erlingsson et al. | | 710/1 |
| 2006/0106949 A1 * | 5/2006 | Nicolson et al. | | 710/5 |
| 2006/0195663 A1 * | 8/2006 | Arndt et al. | | 711/153 |
| 2006/0209863 A1 * | 9/2006 | Arndt et al. | | 370/412 |
| 2006/0230218 A1 * | 10/2006 | Warren | G06F 3/0607 | 710/315 |
| 2006/0236067 A1 * | 10/2006 | Attinella et al. | | 711/173 |
| 2007/0088895 A1 * | 4/2007 | Gustafson et al. | | 710/306 |
| 2007/0266179 A1 * | 11/2007 | Chavan et al. | | 709/250 |

(Continued)

*Primary Examiner* — Henry Tsai
*Assistant Examiner* — Christopher Bartels

(57) ABSTRACT

Methods and systems for managing Serial Advanced Technology Attachment ("SATA") affiliation transfers between a requesting controller and a granting controller of a storage system. After receiving an affiliation request from the requesting controller, the granting controller queries a number of commands that are queued locally at the granting controller. The granting controller grants the affiliation to the requesting controller after a period of time that is determined based on the queried number of commands that are queue locally.

20 Claims, 6 Drawing Sheets

(56) References Cited

U.S. PATENT DOCUMENTS

| | | | |
|---|---|---|---|
| 2008/0005410 A1* | 1/2008 | Mies | G06F 3/0614 710/62 |
| 2008/0022026 A1* | 1/2008 | Yang | G06F 13/387 710/200 |
| 2008/0052728 A1* | 2/2008 | Steinmetz et al. | 719/313 |
| 2008/0155145 A1* | 6/2008 | Stenfort | 710/100 |
| 2008/0162773 A1* | 7/2008 | Clegg et al. | 710/316 |
| 2008/0244139 A1* | 10/2008 | Nakajima | 710/300 |
| 2009/0077276 A1* | 3/2009 | Kato et al. | 710/39 |
| 2014/0019645 A1* | 1/2014 | Joshi | H04L 49/00 710/5 |

\* cited by examiner

METHODS AND CONTROLLERS FOR AFFILIATION MANAGMENT

BACKGROUND

1. Field of the Invention

The invention relates generally to storage controllers and more specifically relates to Serial Advanced Technology Attachment ("SATA") affiliation transfers.

2. Discussion of Related Art

Serial Attached Small Computer System Interface ("SAS") comprises a family of standards for a computer system to couple with high speed peripheral devices (including storage devices). Many details of the SAS family of standards may be found at www.t10.org. For example, the SATA Tunneling Protocol ("STP") allows a computer system having a SAS interface to communicate with a SATA device (including a SATA disk drive) through a tunnel established for SATA related communications in a SAS environment.

Multiple computer systems may communicate with a single SATA device through at least a SAS expander and/or a SATA multiplexer. However, a SATA device may only be associated with a single computer system at a time. The computer system (or a controller coupled with the computer system) is often referred to as an STP initiator, and the association with the single STP initiator is often referred to as an affiliation. Because there can be multiple STP initiators, the affiliation is transferred from a first STP initiator to a second STP initiator when the second STP initiator needs to communicate with the SATA device. If the second STP initiator attempts to send a command to the SATA device when the first STP initiator still owns the affiliation, the second STP initiator would receive a particular error code indicating an affiliation ownership block.

An STP initiator may need to send multiple commands to a SATA device. An affiliation may be transferred from the first STP initiator to the second STP initiator even when the first STP initiator has only sent a few commands. This is because the second STP initiator may also need to send commands to the SATA device. But the affiliation is then transferred right back to the first STP initiator because the first STP initiator still has more commands to send, even when the second STP initiator has only sent a few commands. However, the affiliation is again transferred to the second STP initiator because the second STP initiator has more commands to send.

Affiliation transfers can add significant processing overhead to each STP initiator. Especially when the affiliation is constantly transferred between STP initiators, performance of the SATA device can be impacted significantly as the STP initiators are unable to readily send commands and make full use of the SATA device.

Thus it is an ongoing challenge to improve performance of a SATA device when affiliation transfers between two or more STP initiators are involved in accessing the SATA device.

SUMMARY

The present invention solves the above and other problems, thereby advancing the state of the useful arts, by providing methods and systems for managing affiliation transfers between STP initiators, one being a requesting controller and another being a granting controller. By delaying the grant of an affiliation based on a number of commands queued locally at the granting controller, the affiliation is no longer constantly transferred between controllers. Accordingly, controllers are better able to make full use of SATA devices.

In one aspect hereof, an affiliation request from the requesting controller comprises information relating to a number of commands queued at the requesting controller. A second/delaying period of time may be determined based on the affiliation request. The second/delaying period of time may also be determined based on the affiliation request and the number of commands queued locally at the granting controller in another aspect hereof. The granting controller waits the second/delaying period of time after granting the affiliation to the requesting controller before the granting controller attempts to access a SATA device. The second/delaying period of time allows the requesting controller to access the SATA device before the granting controller attempts to access the SATA device.

In another aspect hereof, a method is provided for managing Serial Advanced Technology Attachment ("SATA") affiliation transfers between a requesting controller and a granting controller of a storage system. The method comprises receiving, at the granting controller, an affiliation request from the requesting controller. The method also comprises querying, at the granting controller, a number of commands queued at the granting controller. Additionally, the method comprises determining, at the granting controller, a period of time based on the number of queued commands. The method further comprises granting, after the period of time, an affiliation to the requesting controller.

Yet another aspect hereof provides a storage system comprising a granting controller for managing Serial Advanced Technology Attachment ("SATA") affiliation transfers with a requesting controller. The granting controller comprises a reading element adapted for receiving, at the granting controller, an affiliation request from the requesting controller. The granting controller further comprises a querying element adapted for querying, at the granting controller, a number of commands queued at the granting controller. Additionally, the granting controller comprises a determining element adapted for determining, at the granting controller, a period of time based on the number of queued commands. The granting controller also comprises a granting element adapted for granting, after the period of time, an affiliation to the requesting controller.

DETAILED DESCRIPTION OF THE DRAWINGS

Figure 1:
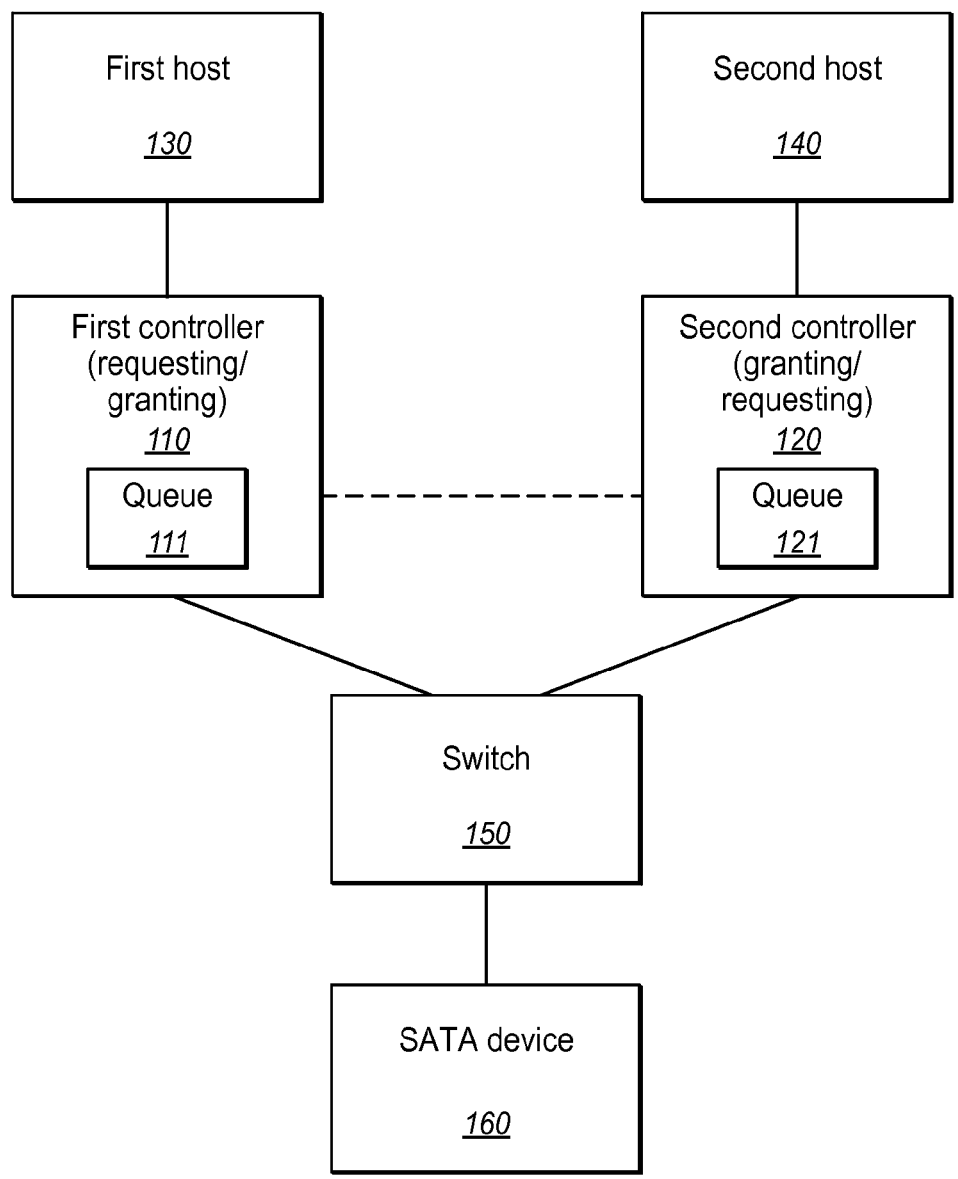
FIG. 1 is a block diagram of an exemplary system for managing affiliation transfers in accordance with features and aspects hereof.

FIG. 1 is a block diagram of an exemplary system for managing affiliation transfers in accordance with features and aspects hereof. A first controller 110, which may be a requesting controller or a granting controller, is in communication with a first host 130 and a switch 150. A second controller 120, which may also be a granting controller or a requesting controller, is in communication with a second host 140 and a switch 150. The first controller 110 and the second controller 120 can also communicate with each other as indicated by the dashed line. The first controller 110 comprises a local queue 111 so that commands to be sent to a SATA device 160 can be queued. Likewise, the second controller 120 comprises a local queue 121 so that commands to be sent to the SATA device 160 can also be queued. The switch 150 is in communication with the SATA device 160.

The first host 130 and the second host 140 may each be a computer system including a server that is coupled with the SATA device 160. The first controller 110 and the second controller 120 may comprise instructions to be executed on a suitable processor and/or a circuit that implement features and aspects hereof as will be explained in greater detail. When the first controller 110 is a requesting controller, the second controller 120 would be a granting controller, and vice versa. The two controllers communicate with each other to coordinate affiliation transfers. For example, the first controller 110 as a requesting controller may transmit an affiliation request to the second controller 120 in order to gain access to the SATA device 160. In response, the second controller 120 as a granting controller may grant the affiliation to the first controller 110 after waiting a certain period of time. The two controllers may communicate with each other through a SAS domain, a network including Ethernet, and/or any other type of links including a dedicated cable connection.

The switch 150 may be any switch device that allows the SATA device 160 to be shared by multiple STP initiators. For example, the switch 150 may be part of a SAS expander and/or a SATA multiplexer as will be explained in greater detail. The SATA device 160 may be a SATA disk drive. Accordingly, the first host 130 can access the SATA device 160 through the switch 150 and the first controller 110, after the first controller 110 is granted the affiliation.

Figure 2:
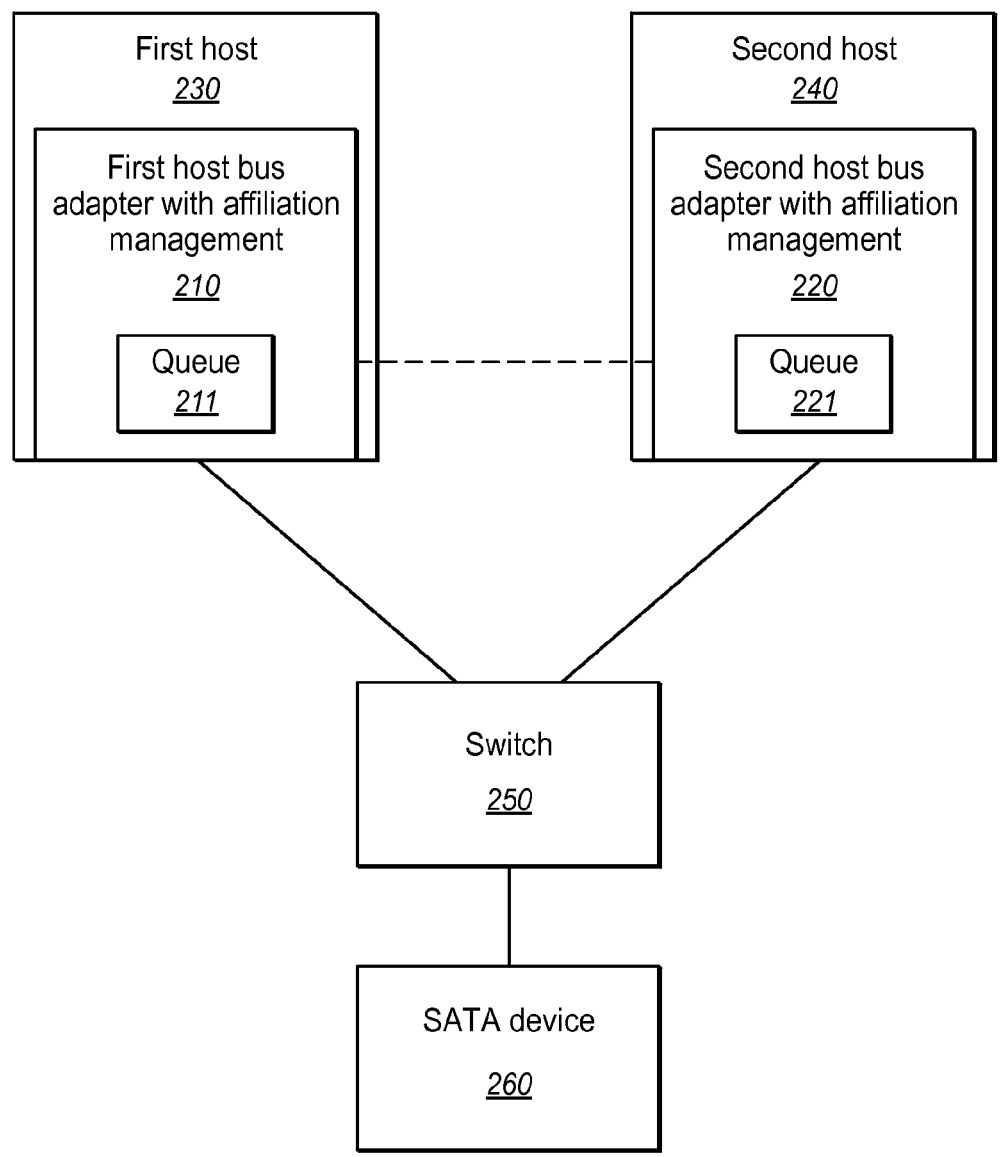
FIG. 2 is a block diagram of another exemplary system for managing affiliation transfers in accordance with features and aspects hereof.

FIG. 2 is a block diagram of another exemplary system for managing affiliation transfers in accordance with features and aspects hereof. A first host bus adapter 210 is in communication with a first host 230 and a switch 250. A second host bus adapter 220 is in communication with a second host 240 and the switch 250. The first host bus adapter 210 and the second host bus adapter 220 can also communicate with each other as indicated by the dashed line. The first host bus adapter 210 comprises a local queue 211 so that commands to be sent to a SATA device 260 can be queued. Likewise, the second host bus adapter 220 comprises a local queue 221 so that commands to be sent to the SATA device 260 can also be queued. The switch 250 is in communication with the SATA device 260.

The first host bus adapter 210 and the second host bus adapter 220 may be a Redundant Array of Independent Disks ("RAID") adapter, for example, that allow their respective first host 230 and second host 240 to implement a RAID storage system. The first host bus adapter 210 and the second host bus adapter 220 also comprise instructions to be executed on a suitable processor and/or affiliation management circuitry that implement features and aspects hereof. When the first host bus adapter 210 performs functions of a requesting controller, the second host bus adapter 220 would perform functions of a granting controller, and vice versa. The switch 250 and the SATA device 260 are similar to those of FIG. 1. Operations of the various elements are similar to those of FIG. 1. For example, the first host bus adapter 210 communicates with the second bus adapter 220 to coordinate affiliation transfers. Accordingly, the first host 230 can access the SATA device 260 through the switch 250 and the first host bus adapter 210, after the first host bus adapter 210 has been granted the affiliation.

Figure 3:
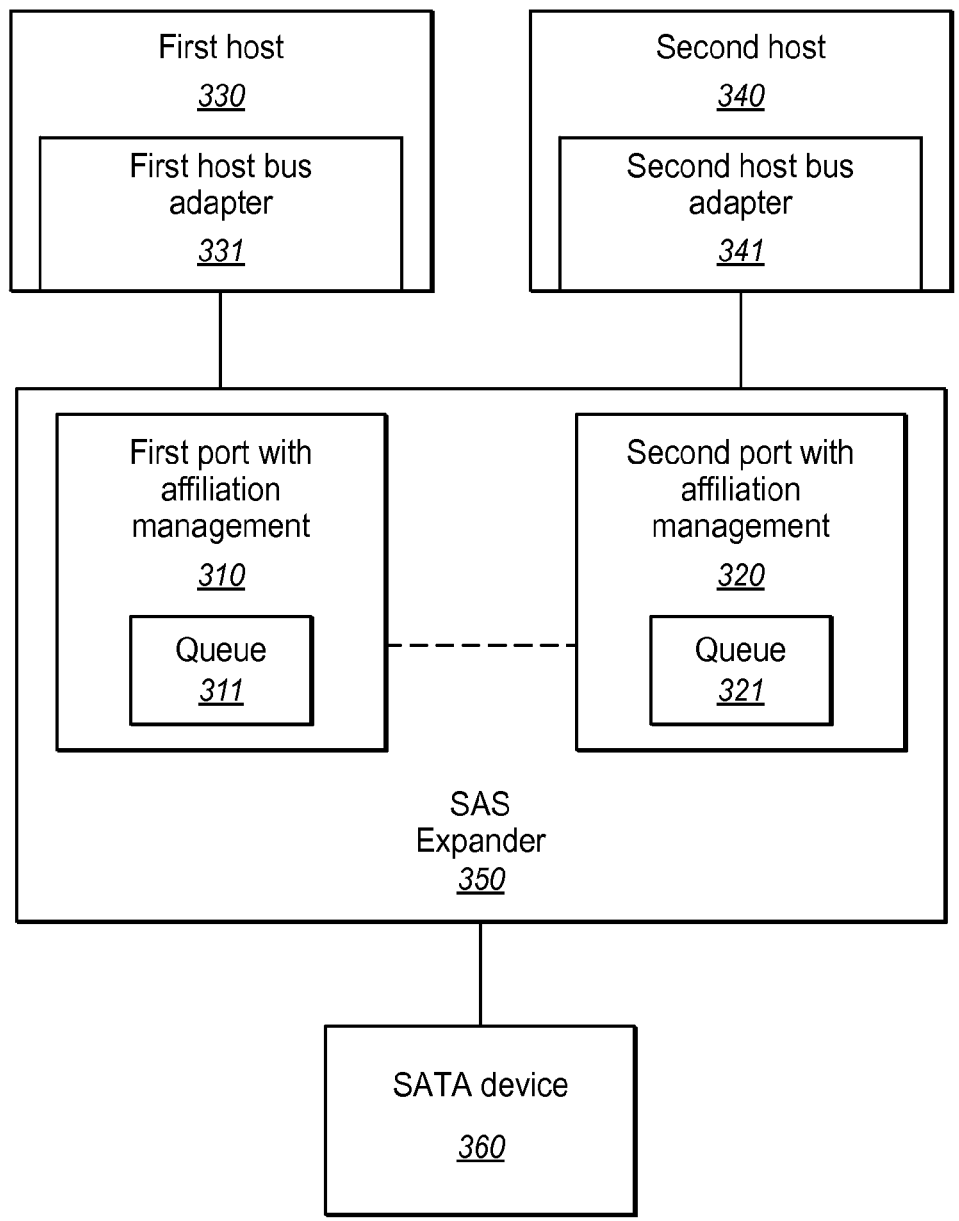
FIG. 3 is a block diagram of yet another exemplary system for managing affiliation transfers in accordance with features and aspects hereof.

FIG. 3 is a block diagram of yet another exemplary system for managing affiliation transfers in accordance with features and aspects hereof. A first port 310 of a SAS expander 350 is in communication with a first host 330 through a first host bus adapter 331 of the first host 330. A second port 320 of the SAS expander 350 is in communication with a second host 340 through a second host bus adapter 341 of the second host 340. The first port 310 of the SAS expander 350 is also in communication with the second port 320 as indicated by the dashed line. The first port 310 comprises a local queue 311 so that commands to be sent to a SATA device 360 can be queued. Likewise, the second port 320 comprises a local queue 321 so that commands to be sent to the SATA device 360 can also be queued. The SAS expander 350 is in communication with the SATA device 360.

The first host bus adapter 331 and the second host bus adapter 341 may be Redundant Array of Independent Disks ("RAID") adapters, for example, that allow their respective first host 330 and second host 340 to implement a RAID storage system. The first port 310 and the second port 320 of the SAS expander 350 comprise instructions to be executed on a suitable processor and/or affiliation management circuitry that implement features and aspects hereof. It will be understood that although the first port 310 and the second port 320 may be distinct conceptually, the affiliation management logic may be more centrally implemented in the SAS expander 350, for example, with a single microcontroller. When the first port 310 performs functions of a requesting controller, the second port 320 would perform functions of a granting controller, and vice versa. The SAS expander 350 also comprises switching logic for communication between multiple SAS/SATA devices. Here, the SAS expander 350 allows the SATA device 360 to be shared by both the first host 330 and the second host 340. The SATA device 360 is similar to that of FIG. 1.

Additionally, the first port 330 and the second port 340 may be in communication with each other through the SAS expander 350. For example, the first port 330 and the second port 340 may communicate with each other by exchanging SAS/SCSI commands that may be newly created for requesting and granting an affiliation. Operations of the various elements are conceptually similar to those of FIG. 1. For example, the first port 310 communicates with the second port 320 to coordinate affiliation transfers. Accordingly, the first host 330 can access the SATA device 360 through the first host bus adapter 331 and the first port 310 of the SAS expander 350, after the first port 310 is granted the affiliation.

Figure 4:
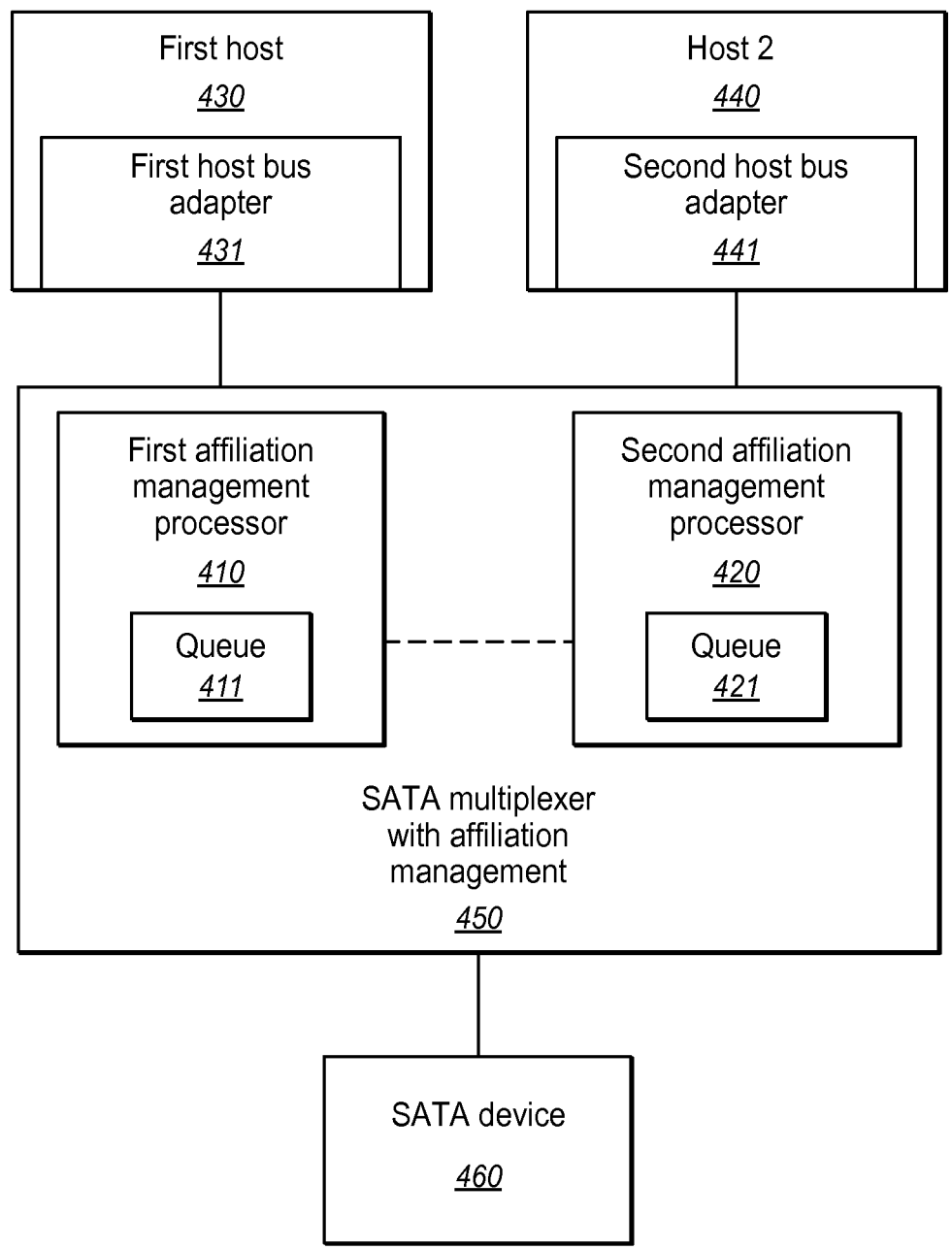
FIG. 4 is a block diagram of another exemplary system for managing affiliation transfers in accordance with features and aspects hereof.

FIG. 4 is a block diagram of another exemplary system for managing affiliation transfers in accordance with features and aspects hereof. A first affiliation management processor 410 of a SATA multiplexer 450 is in communication with a first host 430 through a first host bus adapter 431 of the first host 430. A second affiliation management processor 420 of the SATA multiplexer 450 is in communication with a second host 440 through a second host bus adapter 441 of the second host 440. The first affiliation management processor 410 is also in communication with the second affiliation management processor 420 as indicated by the dashed line. The first affiliation management processor 410 comprises a local queue 411 so that commands to be sent to a SATA device 460 can be queued. Likewise, the second affiliation management processor 420 comprises a local queue 421 so that commands to be sent to the SATA device 460 can also be queued. The SATA multiplexer 450 is in communication with the SATA device 460.

The first host bus adapter 431 and the second host bus adapter 441 are similar to those of FIG. 3. The SATA multiplexer 450 comprises switching logic that allows two or more hosts to share the SATA device 460. The SATA multiplexer 450 also comprises instructions to be executed on a suitable processor and/or affiliation management circuitry including the first affiliation management processor 410 and the second affiliation management processor 420 that implement features and aspects hereof. When the first affiliation management processor 410 performs functions of a requesting controller, the second affiliation management processor 420 would perform functions of a granting controller, and vice versa. The SATA device 460 is similar to that of FIG. 1. Operations of the various elements are conceptually similar to those of FIG. 1. For example, the first affiliation management processor 410 communicates with the second affiliation management processor 420 to coordinate affiliation transfers. Accordingly, the first host 430 can access the SATA device 460 through the first host bus adapter 431 and the first affiliation management processor 410 of the SAS multiplexer 450, after the first affiliation management processor 410 is granted the affiliation.

Those of ordinary skill in the art will readily recognize numerous additional and equivalent components and modules within a fully functional storage system. Such additional and equivalent components are omitted herein for simplicity and brevity of this discussion. Thus, the structures of FIGS. 1 through 4 are intended merely as a representative of exemplary embodiments of features and aspects hereof to manage affiliation transfers.

Figure 5:
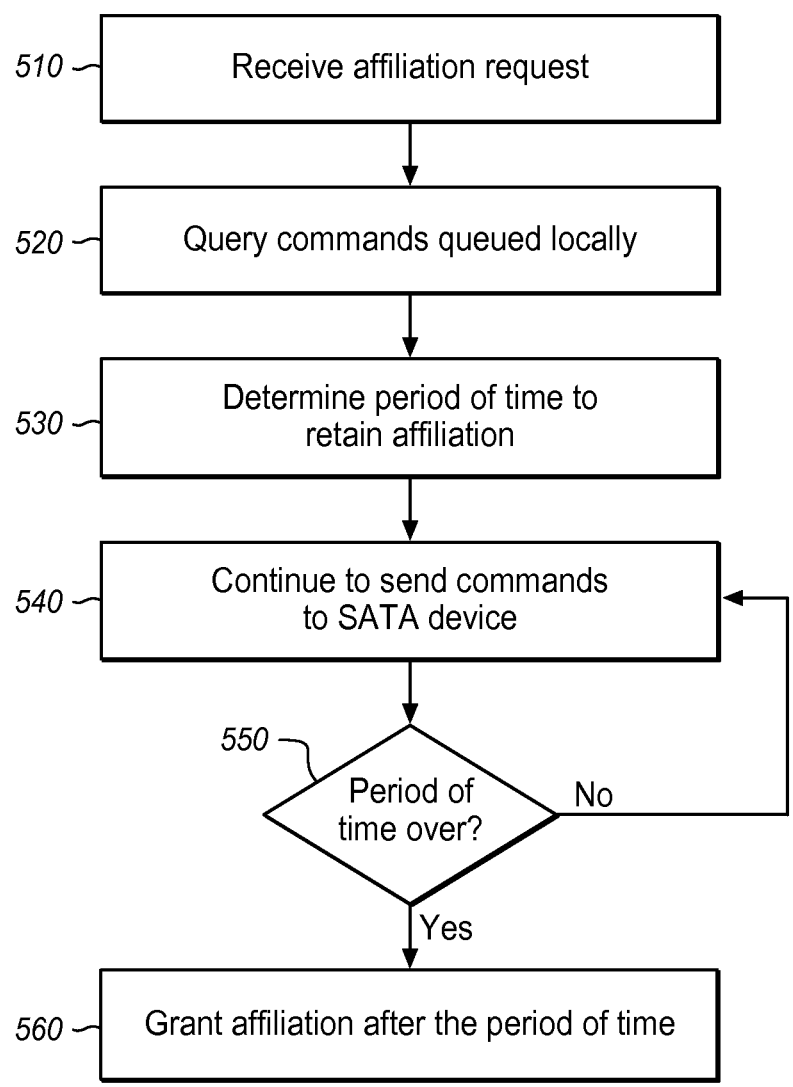
FIG. 5 is a flowchart describing an exemplary method in accordance with features and aspects hereof to manage affiliation transfers.

FIG. 5 is a flowchart describing an exemplary method in accordance with features and aspects hereof to manage affiliation transfers. Initially, a controller that first sends commands to the SATA device may be granted an affiliation, for example, by a SAS expander. The controller may act as a granting controller when another controller requests the affiliation. The controller may also act as a requesting controller when another controller has gained the affiliation, and the controller now needs to gain the affiliation in order to send commands to a SATA device. The controller can detect that another controller has gained the affiliation if the controller receives an error after the controller attempts to send a command to the SATA device.

The steps of FIG. 5 are directed to a granting controller when another controller needs to gain the affiliation. At step 510, the granting controller receives an affiliation request from another controller—a requesting controller. In response to receiving the affiliation request, the granting controller queries a number of commands queued locally at the granting controller at step 520. Based on the number of commands queued, the granting controller determines at step 530 a period of time during which the granting controller should retain the affiliation. The granting controller may use the number of commands to calculate the period of time by using a multiplicative scaling factor, a function including a polynomial function, and/or a lookup table. If there is no command queued locally, the period of time may simply be zero.

The granting controller continues processing its queued commands, if any, by sending commands to the SATA device at step 540 during the period of time. At step 550, the granting controller may check if the period of time is over. If not, the granting controller returns to step 540 and continues to send commands. Otherwise, the granting controller continues to step 560. Alternatively, the period of time may be implemented as a timer that is triggered when the period of time expires. After the period time has passed or there are no more local commands to process, the granting controller grants the affiliation to the requesting controller at step 560. Subsequently, the granting controller stops sending commands to the SATA device, and instead queues any additional commands that the granting controller needs to send to the SATA device.

Waiting the period of time to pass can allow the granting controller to send additional commands to the SATA device compared to immediately granting affiliation to the requesting controller after receiving an affiliation request from the requesting controller. Consequently, affiliation is no longer constantly transferred between controllers. Thus, performance of the SATA device is improved as the controllers are able to more readily send commands and make fuller use of the SATA device.

Figure 6:
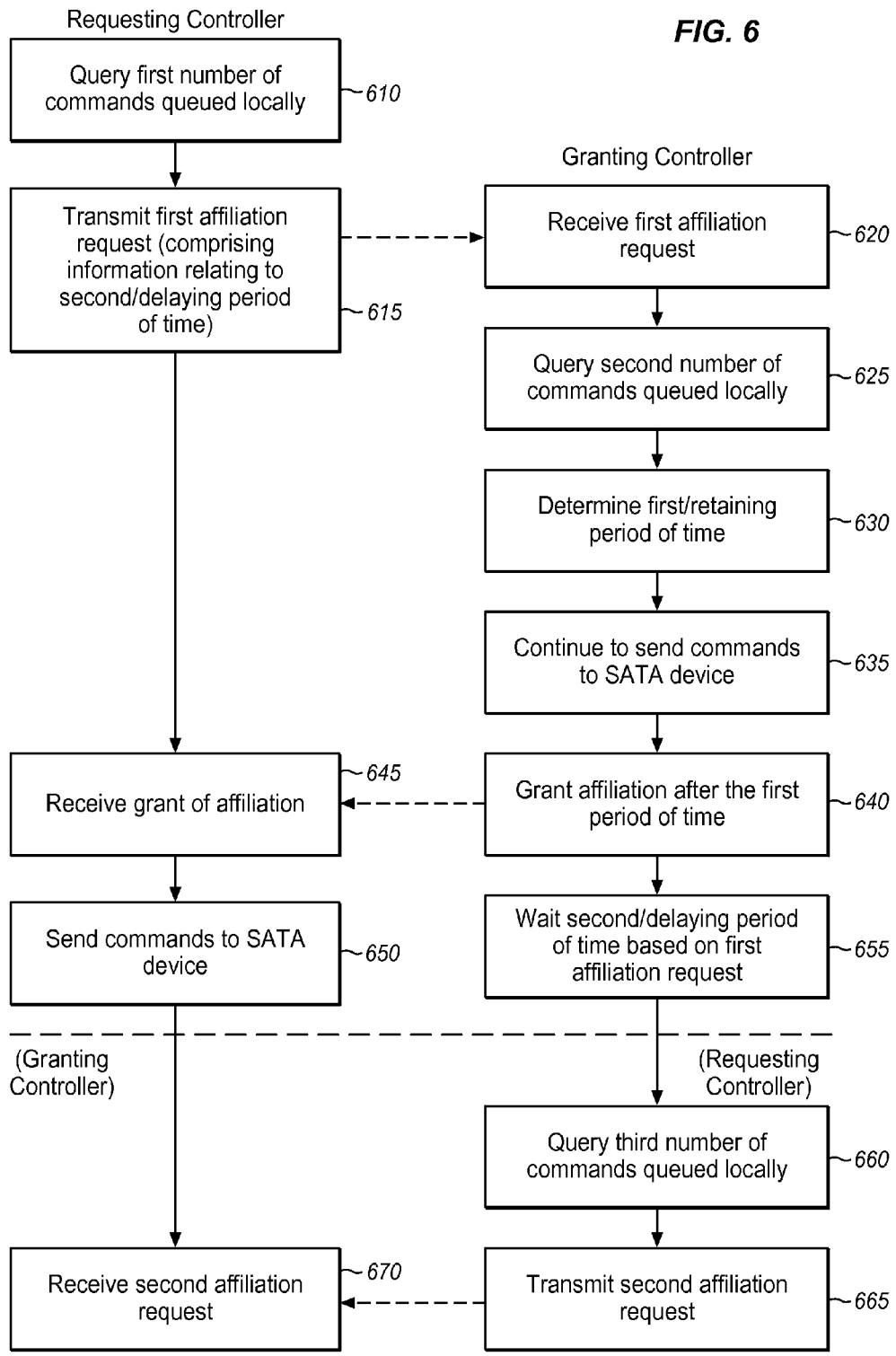
FIG. 6 is a flowchart describing another exemplary method in accordance with features and aspects hereof to manage affiliation transfers.

FIG. 6 is a flowchart describing another exemplary method in accordance with features and aspects hereof to manage affiliation transfers. It is assumed that initialization of controllers has been completed and the requesting controller has determined that the requesting controller has not gained an affiliation. For example, the requesting controller may have initially received an error when the requesting controller attempted to send a command to the SATA device, meaning that the requesting controller has not gained the affiliation.

At step 610, the requesting controller queries a first number of commands that are queued locally at the requesting controller. The requesting controller then transmits a first affiliation request that comprises information relating to a period of time at step 615. The period of time, which is determined based on the first number of commands that is queried at step 610, will be discussed as a second/delaying period of time from the perspective of the granting controller. The requesting controller does not attempt to send any additional commands to the SATA device until the granting controller grants the affiliation to the requesting controller.

At step 620, the granting controller receives the first affiliation request from the requesting controller. At step 625, the granting controller then queries a second number of commands that are queued locally at the granting controller. Based on the second number of commands, the granting controller determines a first/retaining period of time at step 630 similar to step 530 of FIG. 5. The granting controller continues to send commands to the SATA device during the first/retaining period of time at step 635. After the first/retaining period of time has passed or there are no more local commands to process, the granting controller grants the affiliation to the requesting controller at step 640.

Prior to transmitting a message to grant the affiliation to the requesting controller, the granting controller stops sending commands to the SATA device, and instead queues any additional commands that the granting controller needs to send to the SATA device. The granting controller then transmits the message to grant the affiliation to the requesting controller; the requesting controller receives the message at step 645 and proceeds to send commands to the SATA device at step 650. Meanwhile, rather than requesting the affiliation back immediately, the granting controller waits at step 655 a second/delaying period of time. The second/delaying period may be based on the first affiliation request. The second/delaying period may also be based on the first affiliation request and the second number of commands queued locally at the granting controller in another aspect hereof.

It is noted that the first affiliation request was originally transmitted from the requesting controller at step 615. The second/delaying period of time may be determined by either the requesting controller and/or the granting controller. The second/delaying period of time may be calculated by using a multiplicative scaling factor, a function including a polynomial function, and/or a lookup table. The first affiliation request that is transmitted from the requesting controller at step 615 may comprise the first number of commands, the second/delaying period of time, and/or any intermediate value between the two numbers. In another aspect hereof, the granting controller may determine the second/delaying period based on a comparison between the first number of commands and the second number of commands.

After the second/delaying period of time has passed, the granting controller starts to perform functions as a new requesting controller. Correspondingly, the requesting controller starts to perform functions as a new granting controller. The step 610 that was performed by the previous requesting controller is performed as step 660 by the new requesting controller. At step 660, the new requesting controller queries a third number of commands queued locally. Then the step 615 that was performed by the previous requesting controller is performed as step 665 by the new requesting controller by transmitting a second affiliation request to the new granting controller. Meanwhile, the new granting controller has been sending commands to the SATA device after being granted the affiliation. The step 620 that was performed by the previous granting controller is performed as step 670 by the new granting controller to receive the second affiliation request.

Waiting the second/delaying period of time to pass by the granting controller at step 655 can allow the new granting controller to send additional commands to the SATA device compared to not waiting the second/delaying period of time. This is because when a granting controller receives an affiliation request, including at steps 620 and 670, the granting controller queries a number of commands that are queued locally at the time of receiving the affiliation request. However, the queried number of commands cannot account for any additional commands that may be queued after the time of receiving the affiliation request. Delaying the second/delaying period time addresses this lacking by allowing the queried number of commands to account for commands that are queued during the second/delaying period time. Thus, performance of the SATA device is improved again as affiliation transfers between controllers is further reduced.

Those of ordinary skill in the art will readily recognize numerous additional and equivalent steps that may be performed in the methods of FIGS. 5 and 6. Such additional and equivalent steps are omitted herein merely for brevity and simplicity of this discussion. For example, the requesting and/or the granting controller may determine that affiliation management is not needed. If so, the requesting controller may transmit the first affiliation without information relating to a period of time at step 615 of FIG. 6, and/or the granting controller may grant affiliation as soon as the affiliation request is received. The requesting and/or the granting controller may also determine that affiliation management is needed and starts to perform affiliation management according to features and aspects hereof. The requesting and/or the granting controller may determine whether affiliation management is needed after having gathered certain performance metrics through processing a number of affiliation requests and/or sending a number of commands to the SATA device.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for managing Serial Advanced Technology Attachment ("SATA") affiliation transfers between a requesting controller and a granting controller of a storage system, wherein both the granting controller and the requesting controller are coupled with a SATA storage device, the method comprising:
   receiving commands in the granting controller from a first host system coupled with the granting controller, wherein the commands received from the first host system are queued within the granting controller for forwarding to the SATA storage device;
   receiving commands in the requesting controller from a second host system coupled with the requesting controller, wherein the second host system is distinct from the first host system, and wherein the commands received from the second host system are queued within the requesting controller for forwarding to the SATA storage device;
   receiving, at the granting controller, an affiliation request from the requesting controller, wherein the granting controller is presently affiliated with the SATA storage device;
   querying, at the granting controller, a number of commands queued at the granting controller;
   determining, at the granting controller, a period of time based on the number of queued commands; and
   granting, by operation of the granting controller after the period of time, an affiliation to the requesting controller to permit the requesting controller to access the SATA storage device when the granting controller has commands queued.

2. The method of claim 1, wherein the granting controller continues to send commands to a SATA device during the period of time.

3. The method of claim 1, wherein the period of time is a first period of time and the affiliation request is a first affiliation request, and wherein the first affiliation request comprises information relating to a second period of time, the method further comprising:
   waiting the second period of time after granting the affiliation; and
   transmitting, following the waiting step, a second affiliation request from the granting controller to the requesting controller.

4. The method of claim 3, wherein the number of commands is a first number of commands, the method further comprising:
   querying, at the granting controller, a second number of commands queued at the granting controller following the waiting step;
   wherein the second affiliation request comprises information relating to the second number of commands.

5. The method of claim 3, wherein the number of commands is a first number of commands, the method further comprising:
   querying, at the requesting controller, a second number of commands queued at the requesting controller; and transmitting, from the requesting controller to the granting controller, the first affiliation request, wherein the first affiliation request comprises information relating to the second period of time;

wherein the second period of time is determined based on the second number of commands.

6. The method of claim 1, wherein the period of time is a first period of time, and wherein the affiliation request comprises information relating to a second period of time.

7. The method of claim 1, wherein the number of commands is a first number of commands, the method further comprising:

querying, at the requesting controller, a second number of commands queued at the requesting controller; and transmitting, from the requesting controller to the granting controller, the first affiliation request, wherein the first affiliation request comprises information relating to the second number of commands.

8. The method of claim 1, wherein a host bus adapter ("HBA") comprises the requesting controller.

9. The method of claim 1, wherein a SAS expander comprises the granting controller.

10. The method of claim 1, wherein a SATA multiplexer comprises the requesting controller.

11. A storage system comprising:

a requesting controller coupled to receive commands from a first host system; and a granting controller for managing Serial Advanced Technology Attachment ("SATA") affiliation transfers with the requesting controller wherein the granting controller is coupled to receive commands from a second host system distinct from the first host system, wherein commands received from the first host system are queued within the requesting controller for forwarding to the SATA storage device, wherein commands received from the second host system are queued within the granting controller for forwarding to the SATA storage device, wherein both the granting controller and the requesting controller are coupled with a SATA storage device, the granting controller comprising:

a reading element adapted for receiving, at the granting controller, an affiliation request from the requesting controller, wherein the granting controller is presently affiliated with the SATA storage device;

a querying element adapted for querying, at the granting controller, a number of commands queued at the granting controller;

a determining element adapted for determining, at the granting controller, a period of time based on the number of queued commands; and a granting element adapted for granting, after the period of time, an affiliation to the requesting controller to permit the requesting controller to access the SATA storage device when the granting controller has commands queued.

12. The storage system of claim 11, wherein the granting controller is adapted to continue sending commands to a SATA device during the period of time.

13. The storage system of claim 11, wherein the period of time is a first period of time and the affiliation request is a first affiliation request, and wherein the first affiliation request comprises information relating to a second period of time, the granting controller further comprising:

a waiting element for waiting the second period of time after granting the affiliation; and a transmitting element for transmitting, following the waiting step, a second affiliation request from the granting controller to the requesting controller.

14. The storage system of claim 13, wherein the number of commands is a first number of commands, the granting controller further comprising:

a second querying element for querying, at the granting controller, a second number of commands queued at the granting controller following the waiting step;

wherein the second affiliation request comprises information relating to the second number of commands.

15. The storage system of claim 13, wherein the number of commands is a first number of commands, the requesting controller further comprising:

a second querying element for querying, at the requesting controller, a second number of commands queued at the requesting controller; and a transmitting element for transmitting, from the requesting controller to the granting controller, the first affiliation request, wherein the first affiliation request comprises information relating to the second period of time;

wherein the second period of time is determined based on the second number of commands.

16. The storage system of claim 11, wherein the period of time is a first period of time, and wherein the affiliation request comprises information relating to a second period of time.

17. The storage system of claim 11, wherein the number of commands is a first number of commands, the requesting controller further comprising:

a second querying element for querying, at the requesting controller, a second number of commands queued at the requesting controller; and a transmitting element for transmitting, from the requesting controller to the granting controller, the first affiliation request, wherein the first affiliation request comprises information relating to the second number of commands.

18. The storage system of claim 11, wherein a host bus adapter ("HBA") comprises the granting controller.

19. The storage system of claim 11, wherein a Serial Attached SCSI ("SAS") expander comprises the requesting controller.

20. The storage system of claim 11, wherein a SATA multiplexer comprises the granting controller.

* * * * *